US012217283B2

(12) United States Patent
Brock et al.

(10) Patent No.: US 12,217,283 B2
(45) Date of Patent: *Feb. 4, 2025

(54) CROSS-MERCHANT PROMOTIONS

(71) Applicant: Block, Inc., Oakland, CA (US)

(72) Inventors: Zachary Brock, San Francisco, CA (US); John Ryan Crepezzi, San Francisco, CA (US); Bruce Bell, New York, NY (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,332

(22) Filed: Apr. 28, 2023

(65) Prior Publication Data

US 2023/0259978 A1    Aug. 17, 2023

Related U.S. Application Data

(63) Continuation of application No. 16/888,642, filed on May 29, 2020, now Pat. No. 11,640,624, which is a
(Continued)

(51) Int. Cl.
*G06Q 30/02* (2023.01)
*G06Q 30/0207* (2023.01)
(Continued)

(52) U.S. Cl.
CPC ..... *G06Q 30/0268* (2013.01); *G06Q 30/0214* (2013.01); *G06Q 30/0224* (2013.01); *G06Q 30/0238* (2013.01); *G06Q 30/0255* (2013.01); *G06Q 30/0259* (2013.01); *G06Q 30/0271* (2013.01)

(58) Field of Classification Search
None
See application file for complete search history.

(56) References Cited

U.S. PATENT DOCUMENTS 6,694,300 B1   2/2004  Walker et al.
7,555,444 B1   6/2009  Wilson et al.
(Continued)

FOREIGN PATENT DOCUMENTS

WO    2013/184844 A2    12/2013

*Primary Examiner* — Vincent M Cao
(74) *Attorney, Agent, or Firm* — Lee & Hayes, P.C.

(57) ABSTRACT

Technology is disclosed for facilitating and processing cross-merchant promotions. In examples, the disclosed technology comprises identifying a first merchant and a second merchant as complementary merchants based at least in part on first transaction data associated with a plurality of merchants; generating a recommendation for the first and second merchants to participate in a cross-merchant promotion; receiving an indication that the first merchant and the second merchant intend to participate in the cross-merchant promotion; receiving second transaction data for a second transaction of the first merchant; applying the cross-merchant promotion to the second transaction based at least in part on a payment card number offered for payment in the second transaction; processing payment for the second transaction based at least in part on the cross-merchant promotion; and apportioning the payment between the first and second merchant according to an agreement between them.

20 Claims, 6 Drawing Sheets

Related U.S. Application Data continuation of application No. 14/482,948, filed on Sep. 10, 2014, now Pat. No. 10,949,888.

(51) Int. Cl.
  *G06Q 30/0214* (2023.01)
  *G06Q 30/0238* (2023.01)
  *G06Q 30/0251* (2023.01)

(56) References Cited

U.S. PATENT DOCUMENTS

| | | |
|---|---|---|
| 8,255,268 B2 | 8/2012 | Rane et al. |
| 9,633,344 B2 | 4/2017 | Nathanel et al. |
| 9,665,858 B1 | 5/2017 | Kumar |
| 10,949,888 B1 | 3/2021 | Brock et al. |
| 11,640,624 B2 | 5/2023 | Brock et al. |
| 2001/0023408 A1* | 9/2001 | McEvoy ............ G06Q 30/0251 705/14.36 |
| 2001/0037205 A1 | 11/2001 | Joao |
| 2002/0013728 A1 | 1/2002 | Wilkman |
| 2002/0038246 A1 | 3/2002 | Nagaishi |
| 2002/0123960 A1 | 9/2002 | Ericksen |
| 2002/0160817 A1 | 10/2002 | Salmimaa et al. |
| 2002/0178060 A1 | 11/2002 | Sheehan |
| 2003/0074328 A1 | 4/2003 | Schiff et al. |
| 2003/0101454 A1 | 5/2003 | Ozer et al. |
| 2003/0132298 A1* | 7/2003 | Swartz ............... G06Q 20/3276 235/472.02 |
| 2003/0171096 A1 | 9/2003 | Ilan et al. |
| 2003/0200108 A1 | 10/2003 | Malnoe |
| 2004/0034570 A1 | 2/2004 | Davis |
| 2004/0127256 A1 | 7/2004 | Goldthwaite et al. |
| 2004/0158493 A1* | 8/2004 | Nicholson ......... G06Q 30/0224 705/14.25 |
| 2004/0236671 A1 | 11/2004 | Woodruff et al. |
| 2004/0254859 A1 | 12/2004 | Aslanian |
| 2004/0260652 A1 | 12/2004 | Rose |
| 2005/0015299 A1 | 1/2005 | Sisserian |
| 2005/0055270 A1 | 3/2005 | Broe |
| 2005/0171845 A1 | 8/2005 | Halfman et al. |
| 2005/0273440 A1 | 12/2005 | Ching |
| 2005/0277405 A1 | 12/2005 | Noguchi |
| 2006/0085333 A1 | 4/2006 | Wah et al. |
| 2006/0178932 A1 | 8/2006 | Lang |
| 2006/0242011 A1 | 10/2006 | Bell et al. |
| 2006/0282310 A1 | 12/2006 | Burch |
| 2007/0156513 A1 | 7/2007 | Mastrianni et al. |
| 2007/0179836 A1 | 8/2007 | Juang et al. |
| 2007/0221728 A1 | 9/2007 | Ferro et al. |
| 2007/0288503 A1 | 12/2007 | Taylor |
| 2008/0015938 A1 | 1/2008 | Haddad et al. |
| 2008/0133340 A1 | 6/2008 | Do et al. |
| 2008/0133351 A1 | 6/2008 | White et al. |
| 2008/0149707 A1 | 6/2008 | Urcuyo |
| 2008/0201226 A1 | 8/2008 | Carlson et al. |
| 2008/0208688 A1 | 8/2008 | Byerley et al. |
| 2008/0221992 A1 | 9/2008 | Bernstein |
| 2008/0255947 A1 | 10/2008 | Friedman |
| 2008/0262925 A1 | 10/2008 | Kim et al. |
| 2008/0277465 A1 | 11/2008 | Pletz et al. |
| 2009/0016568 A1 | 1/2009 | Kamijoh et al. |
| 2009/0112766 A1 | 4/2009 | Hammad et al. |
| 2009/0138365 A1 | 5/2009 | Mueller et al. |
| 2009/0248578 A1 | 10/2009 | Pollock et al. |
| 2009/0271275 A1* | 10/2009 | Regmi ............... G06Q 30/0245 705/14.73 |
| 2010/0082420 A1 | 4/2010 | Trifiletti et al. |
| 2010/0082468 A1 | 4/2010 | Low et al. |
| 2010/0082487 A1 | 4/2010 | Nelsen |
| 2010/0114344 A1 | 5/2010 | Hannaby |
| 2010/0174596 A1 | 7/2010 | Gilman et al. |
| 2010/0223145 A1 | 9/2010 | Dragt |
| 2011/0024495 A1 | 2/2011 | Anderson |
| 2011/0029370 A1 | 2/2011 | Roeding et al. |
| 2011/0071892 A1 | 3/2011 | Dickelman |
| 2011/0087531 A1 | 4/2011 | Winters et al. |
| 2011/0106840 A1 | 5/2011 | Barrett et al. |
| 2011/0125565 A1* | 5/2011 | MacIlwaine ....... G06Q 30/0273 705/14.1 |
| 2011/0178862 A1 | 7/2011 | Daigle |
| 2011/0210170 A1 | 9/2011 | Arguello |
| 2011/0231329 A1 | 9/2011 | Vianello |
| 2011/0246284 A1 | 10/2011 | Chaikin et al. |
| 2011/0251888 A1 | 10/2011 | Faith et al. |
| 2011/0251892 A1 | 10/2011 | Laracey |
| 2011/0264581 A1 | 10/2011 | Clyne |
| 2011/0302080 A1 | 12/2011 | White et al. |
| 2011/0320345 A1 | 12/2011 | Taveau et al. |
| 2012/0016731 A1 | 1/2012 | Smith et al. |
| 2012/0059701 A1 | 3/2012 | Van et al. |
| 2012/0131094 A1 | 5/2012 | Lyons et al. |
| 2012/0185318 A1 | 7/2012 | Shipley |
| 2012/0185322 A1 | 7/2012 | Shipley |
| 2012/0203608 A1 | 8/2012 | Lele et al. |
| 2012/0221446 A1 | 8/2012 | Grigg et al. |
| 2013/0030889 A1 | 1/2013 | Davich et al. |
| 2013/0041811 A1 | 2/2013 | Vazquez et al. |
| 2013/0046626 A1 | 2/2013 | Grigg et al. |
| 2013/0144715 A1 | 6/2013 | Kranzley et al. |
| 2013/0151344 A1 | 6/2013 | Tavares et al. |
| 2013/0185155 A1 | 7/2013 | Colando |
| 2013/0268431 A1 | 10/2013 | Mohsenzadeh |
| 2013/0346175 A1 | 12/2013 | Muthu |
| 2014/0019256 A1 | 1/2014 | Argue et al. |
| 2014/0032283 A1 | 1/2014 | Bradford et al. |
| 2014/0129357 A1 | 5/2014 | Goodwin |
| 2014/0149197 A1 | 5/2014 | James et al. |
| 2014/0180805 A1 | 6/2014 | Argue et al. |
| 2014/0180826 A1* | 6/2014 | Boal ................. G06Q 30/0269 705/14.66 |
| 2014/0180871 A1 | 6/2014 | Mignano |
| 2014/0188585 A1 | 7/2014 | Thompson et al. |
| 2014/0207622 A1 | 7/2014 | Vijayaraghavan et al. |
| 2014/0207669 A1 | 7/2014 | Rosenberg |
| 2015/0039448 A1 | 2/2015 | Byrne |
| 2015/0199716 A1 | 7/2015 | Gerard |
| 2015/0317681 A1 | 11/2015 | Zamer et al. |

\* cited by examiner

CROSS-MERCHANT PROMOTIONS

RELATED APPLICATIONS

This application is a continuation of and claims priority to U.S. patent application Ser. No. 16/888,642, filed May 29, 2020, and issued as U.S. Pat. No. 11,640,624, on May 2, 2023, which is a continuation of and claims priority to U.S. patent application Ser. No. 14/482,948, filed Sep. 10, 2014, and issued as U.S. Pat. No. 10,949,888, on Mar. 16, 2021, which are incorporated herein by reference.

BACKGROUND

In order to increase customer volume and business, many merchants generally offer discounted products or services by distributing promotion materials to customers to incentivize future visits (e.g., paper advertisements in the form of coupons on a receipt). However, such promotion practice may not be optimal as a customer, who has just made a purchase with a merchant, may not have any incentive to visit that merchant again within an immediate time period, and hence may likely lose and/or forget about the promotion materials.

Additionally, conventional promotion practice is limited to a merchant's own inventory of products and/or services and does not enable a merchant to take advantage of cross-selling. Cross-selling is the practice of selling complementary products and/or services provided by one merchant to a customer of another merchant, thereby enabling multiple merchants to benefit in an increase in customer business. However, cross-selling requires a burdensome establishment and management of relationships between the multiple merchants. Further, promotion materials provided by any one merchant in a cross-selling relationship are typically created based on that merchant's limited knowledge of a customer's purchase history. Such promotion materials are likely ineffective in incentivizing future visits between multiple merchants.

BRIEF DESCRIPTION OF DRAWINGS

One or more embodiments of the disclosed technology are illustrated by way of example, and are not intended to be limited, in the figures of the accompanying drawings, in which like references indicate similar elements or components.

DETAILED DESCRIPTION

Figure 1:
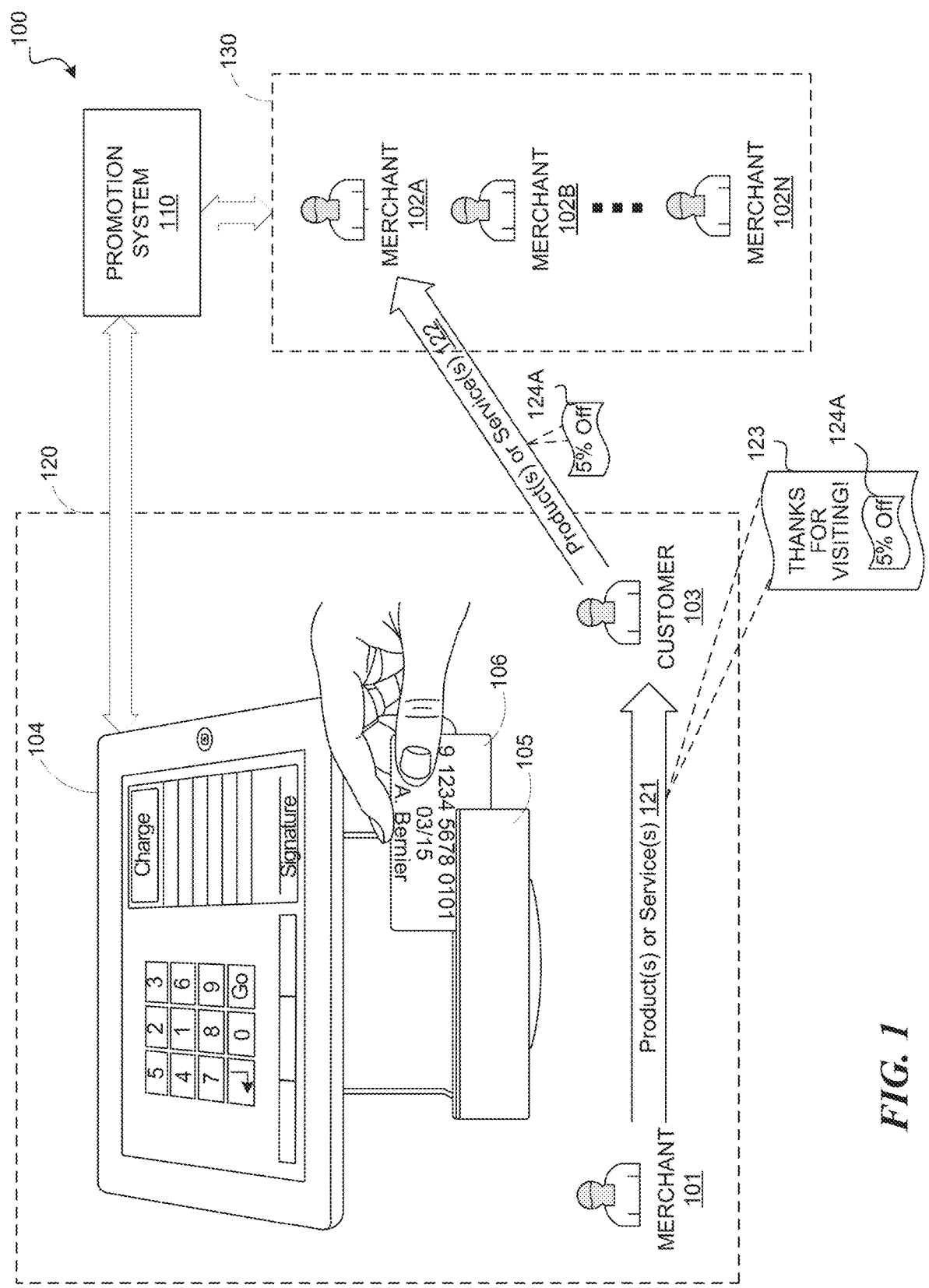
FIG. 1 is a flow diagram illustrating an example process for facilitating the generation and processing of a customized promotion to incentivize customer business between multiple merchants.

Technology is disclosed for facilitating the generation and processing of a customized promotion to incentivize customer business between multiple merchants ("the disclosed technology"). Briefly described, the disclosed technology enables a particular merchant to incentivize customer business (e.g., increase customer traffic to a physical merchant location) by offering a customized promotion for placement in an electronic receipt of a transaction with another merchant, such as a merchant that is geographically located nearby. The customized promotion, which decreases incrementally in value over time, is generated specifically for a product and/or service offered by the particular merchant. The product and/or service associated with the promotion correlates to a set of factors that incentivize the customer business, thereby increasing the likelihood that the customer would redeem the promotion. In some embodiments, upon actual redemption of the promotion with the particular merchant in a second transaction, a portion of the payment in the second transaction is distributed to the other merchant, thereby enabling both merchants to benefit from the placement of the promotion.

In an illustrated use case, a customer makes a purchase of an item with a first merchant (e.g., a coffee shop) by providing a payment card to the first merchant. The first merchant's computer system ("first merchant system") sends information about the purchase to a promotion system, which facilitates the generation and processing of geo-targeted, time-sensitive promotions between multiple merchants. The promotion system analyzes the information in the transaction with the first merchant (i.e., "first transaction") to determine (a) a spending trend associated with a target customer participating in the transaction and (b) a geographical location of that transaction. Note that the spending trend and the geographical location are two factors, of various factors, that the promotion system can utilize in the generation of the promotion.

In some embodiments, the promotion system determines the spending trend by identifying the specific purchase in the first transaction (e.g., coffee) and an identifier associated with the customer, such as the payment card number of the card used in the first transaction. The promotion system further identifies a time ("timestamp") at which the first transaction occurs. Using the payment card number, the promotion system identifies all other past purchases of the customer. The promotion system correlates these past purchases with the current purchase item based on the timestamp to determine the customer's spending trend. For example, the promotion system determines that on Sunday mornings, the customer typically purchases flowers after purchasing coffee.

Once the promotion system has identified the spending trend, it selects, from a specified group of merchants, a second merchant that (a) is located within a specified distance from the geographical location of the first merchant location and (b) provides products and/or services correlating to the spending trend of the customer. The promotion system then generates a promotion for that second merchant and includes that promotion in a receipt for the first transaction. The receipt can be in a paper form or an electronic form (e.g., email or mobile application). The promotion system forwards the receipt with the promotion to the customer at the first merchant location (e.g., coffee shop location) to incentivize a visit to the second merchant location (e.g., flower shop location two blocks away). The promotion can be specific to a product or service offered by the second merchant (e.g., 20% off sunflowers) or it can be specific to just the second merchant (e.g., 20% off anything sold by the second merchant). Further, the promotion can include a time incentive where the promotional value decreases with the passage of time (e.g., 20% if redeemed within the next 30 min. and 10% if redeemed within the next hour).

In some embodiments, the promotion can be in the form of a promotion identifier, such as a QR code, a bar code, or an identification number. In such embodiments, the customer can redeem the promotion by showing, e.g., the receipt from the coffee shop (with the promotion included) at the flower shop. The second merchant can communicate with the promotion system to notify the promotion system that the customer has made a purchase using the promotion. In some embodiments, the second merchant communicates this notification through the second merchant's computer system using an application associated with the promotion system (e.g., a mobile payment application installed on the second merchant's computer system). In some embodiments, the second merchant can communicate this notification manually, e.g., by phone, by fax, by email of a spreadsheet, etc.

In some embodiments, the promotion can be linked to the payment card of the customer. In such embodiments, the customer can redeem the promotion simply by using the same payment card with the second merchant in the second transaction, e.g., to purchase flowers at the flower shop. The second merchant's computer system transmits the payment card information to the promotion system, which analyzes the payment card information to identify an association with the generated promotion. The promotion system can then process the promotion for the customer and sends a confirmation to the second merchant's computer system.

In some embodiments, the promotion system can process a promotion itself, without requiring the second merchant to actually expend money for the promotional value. In such embodiments, the promotion system receives an indication from the second merchant that a purchase using the promotion has occurred. The promotion system, in response to the indication, applies the promotion value to the purchase price by depositing an amount equivalent to the promotion amount to the customer's account. For example, the flower shop pays the promotion service executing the promotion system a facilitation fee of $100 for every week for new customers. The promotion service, in exchange, handles all promotion processing during that week, e.g., by depositing funds into the account of any customer that utilizes a promotion generated by the promotion system. In one example, the customer pays the flower shop $100 for a bouquet, which the flower shop charges the entire amount in the customer's debit card account. Once the flower shop notifies the promotion system, the promotion system credits the customer's debit card account with $10 to account for a "10% discount" promotion.

In some embodiments, the promotion system can further determine a portion of the payment for a purchase made at the second merchant location in response to a promotion, and distribute that portion to the first merchant, e.g., as a business practice that benefits both merchants. The promotion system, in exchange, can receive a facilitation fee from both the first and second merchants for generating and processing the promotion.

Among other benefits, the disclosed technology provides an effective promotion tool to incentivize and increase customer business for merchants, even those merchants that sell different products and/or services from one another. Further, since the generation and processing of the promotions are facilitated by the promotion system, the participating merchants can take advantage of cross-selling, without having to establish and/or maintain any relationship with one another. However, merchants may utilize pre-established relationship to create synergistic promotions, thereby taking further advantage of cross-selling through the promotion system.

Although the example use case provided above uses a payment card number of a customer's payment card as an identifier according to the embodiment described above, in other embodiments, an identifier other than the payment card number may be used to determine the spending trend of the customer. The identifier can be any identification information that identifies the customer including, for example, an email address, a telephone number, a driver's license number, a social security number, an employee identification number (ID), a device identifier, an application identifier, an IP address, a personal identification number (PIN), a card verification value (CVV), a security access code, a biometric identifier (e.g., fingerprint, face, iris, retina, etc.), or any other identification means that function as a combination thereof. Further, as used here, the term "payment card" refers to any payment mechanism, such as a credit card, a debit card, a prepaid gift card, "smartcards" that have embedded integrated circuit chips, e.g., Europay-MasterCard-Visa (EMV) cards, or any card that functions as a combination of any of these mechanisms. A payment card is a specific type of payment object. Other types of payment objects, such as a proxy card or a mobile payment application, can be utilized with the disclosed technology.

Note that the term "customer" may be used interchangeably with "consumer," "payer," or "user" without any intended change in meaning. The term "merchant" may refer to any individual that tenders goods and/or services to another individual. In some embodiments, the term "merchant" may be used interchangeably with "payee" or "recipient" to refer to an individual receiving a payment in exchange for the goods and/or services.

Additionally, the terminology used in this description is to be interpreted in its broadest reasonable manner, even though it is being used in conjunction with a detailed description of certain specific embodiments of the disclosed technology. Indeed, certain terms may even be emphasized below; however, any terminology intended to be interpreted in any restricted manner will be overtly and specifically defined as such in this Detailed Description section.

FIG. 1 is a flow diagram illustrating a process 100 for facilitating the generation and processing of a customized promotion based on a set of one or more factors to incentivize customer business between multiple merchants. The factors can include, for example, a geographical location, a spending trend, and promotion criteria associated with a selected set of customers. As illustrated, the process 100 includes a first merchant 101 at a first location 120, a second merchant 102 at a second location 130, a customer 103 at the first location 120, an electronic device 104 at the first location, and a promotion system 110. Other examples and/or configurations are also possible.

The electronic device 104 can be a general purpose device with data processing capabilities. For example, the electronic device 104 can be a mobile phone, a tablet, an e-reader, other mobile or portable computing devices such as, for example, smart watches or glasses, or other stationary computing devices such as, for example, electronic cash registers.

The promotion system 110 may be a computing system in communication with the electronic device 104, such as over a network. The promotion system 110 can be one or more computing devices. For example, the promotion system 110 can be a server computer, a network of computing systems, a cloud computing environment, a virtualized computing environment, or any combination thereof. Communications between the electronic device 104 and the promotion system 110 can be any form of data communications, including mobile telecommunication (e.g., cellular), WiFi, wireless Ethernet, wired Ethernet, or any other form of Internet connection.

The promotion system 110 enables a promotion service to offer a set of selected merchants the capability to place customized promotions, as an advertisement means for their businesses, in transaction receipts of customers of other merchants. The transaction receipts can be in paper form or electronic form (e.g., email, text message, or mobile application, etc.). The other merchants can include, for example, merchants that are geographically proximate, merchants that are participating with the promotion system 110 (i.e., other merchants in the set of selected merchants), or merchants that are sending electronic receipts). The set of selected merchants include one or more merchants that have submitted a request to participate with the promotion service, such that they be included, or featured, in a promotion generated to target a customer of other merchants. In particular, a customized promotion is generated to incentivize a customer, at another merchant's physical location, to visit the physical location of a particular merchant of the set of selected merchants, where the promotion is generated based on a set of factors. The set of factors can include, for example, the customer's spending trend and promotion criteria associated with the set of selected merchants. The promotion criteria can include, for example, a geographical location, a predetermined distance within the geographical location, a specified time at which the particular merchant experiences low customer volume, a target promotion item, or target customer demographics. In exchange for the promotion, the promotion service, for example, can charge the particular merchant a promotion fee when the customer actually redeems the promotion (i.e., actually visits the particular merchant location to make a purchase). Accordingly, the particular merchant is benefited by having a cost effective promotion tool.

In some embodiments, the particular merchant can request the promotion system 110 to handle the complexity associated with the generation of the promotion. In such embodiments, the particular merchant can simply submit a request, or "bid" to the promotion service, to be placed in any promotion that would increase customer traffic to the particular merchant's business location. The promotion system 110 can then correlate various data associated with one or more factors in a set of factors to decide the "what, when, where, and how" for generating the promotion. The set of factors can include, for example, a spending trend, a predetermined distance within a geographical location (e.g., within a 5 mile radius), a specified low-customer-volume time of day to send out the promotions (e.g., predicted off-peak hours for a merchant), a current time of day at which a current transaction takes place ("timestamp") (e.g., a merchant currently experiencing low customer volume is promoted), the demographics of target customers (e.g., teenagers, males between 22-30, working professionals, shoe aficionados, etc.), the target item(s) to offer in the promotion (e.g., particular items are promoted based on an inventory surplus), promotional value of the promotion (e.g., dollar amount, percentage, or free item), the selected set of merchants that have requested for the service from the promotion system 110 (e.g., only five merchants in the area have signed up to have promotions about them be placed in other merchants' receipts), or any combination thereof.

In some embodiments, the particular merchant can request, or specify, promotion criteria to be taken into consideration by the promotion system 110 for generating the promotion. For example, the particular merchant can specify the target customer demographics desired by the particular merchant (e.g., teenagers, males between 22-30, working professionals, shoe aficionados, etc.), the target item(s) that the particular merchant is willing to offer a promotion, the promotional value, the specified time of low customer volume (e.g., unusually slow traffic between the hours of LOAM and 2 PM), the target merchant location (e.g., a merchant has different coffee shop locations). The promotion system 110 can then correlate various data associated with the promotion criteria to decide the "what, when, where, and how" for generating the promotion. In some embodiments, the promotion system 110 incorporates the promotion criteria received from all merchants in the set of selected merchants as factors in its own set of factors to generate the promotion.

In some embodiments, the particular merchant can establish a relationship with other merchants to indicate a synergistic business arrangement, where each merchant can receive a portion of any payment that results from the placement of promotions on the respective merchant's receipts. In such embodiments, the established relationship can be, for example, another criterion in the promotion criteria associated with each merchant of the set of selected merchants.

For example, Merchant A can establish a synergistic relationship to allow promotions about geographically proximate Merchants B and C to be placed on Merchant A's receipts to customers, in exchange for the same practice from each of Merchants B and C. In this example, the promotion system 110 incorporate this relationship factor to select to promote, for example, Merchants B and C, as opposed to Merchant D (who has no relationship with Merchant A), in the promotion placed in Merchant A's receipt. Further, when a customer makes a purchase with any of the Merchants B and C based on the promotion with Merchant A, Merchant A would receive a portion of that purchase's payment (e.g., 2%), in exchange for the same from each of Merchants B and C. In some embodiments, the established relationship can indicate the promotional value of the generated promotion. For example, the relationship specifies, or defines, a discount amount (e.g., deduction in value or percentage) or a free item that one merchant is willing to offer another merchant for promoting their products or services for sale. For example, Merchant B can offer to Merchant A's customer the promotion, "Get 20% off at Merchant B with $50 purchase at Merchant A."

The promotion system 110 can facilitate the various synergistic relationships for the different merchants. For example, the promotion system 110 can provide an interface to a merchant allowing the merchant to submit information to the promotion system 110 about other geographically proximate merchants that the merchant wishes to establish synergistic relationships. The promotion system 110 provides the merchants with control over the relationships they want to establish. That is, a merchant may want to establish a relationship with other merchants whose products or services are considered to be complimentary. For example, a salon may wish to establish a relationship with a coffee shop down the street, but not a pizza restaurant next door. Once the different merchants have provided the criteria under which the merchants wish to utilize the service of the promotion service, the promotion system 110 can incorporate the criteria associated with the relationships as factors to be included in the set of factors for generating the promotions. In particular, the promotion system 110 can facilitate the generation and processing of the promotions according to the business needs to incentivize customer business between the merchants (e.g., increase customer traffic or visits to the merchants' physical business locations and/or increase transactions with the merchants).

In an illustrated example, the promotion system 110 starts the facilitation when it receives an indication from the first merchant 101 of a first purchase transaction 121. The purchase transaction 121 takes place at the first merchant location 120 where the merchant 101 tenders product(s) or service(s) to the customer 103 in exchange for a payment.

In some embodiments, the indication of the first purchase transaction 121 can be communicated to the promotion system 110 through a mobile payment application installed on the electronic device 104 of the merchant 101. The mobile payment application can be associated with the promotion system 110 (e.g., receives executing instructions from the promotion system 110). The indication can include transaction information collected through the electronic device 104. The transaction information can include, for example, a payment card number of a payment card 106 of the customer 103, where the payment card has been swiped through a card reader 105 of the electronic device 104. The transaction information can also include a transaction item description of a purchase item in the transaction 121.

The promotion system 110 analyzes the transaction information associated with the first purchase transaction 110 to determine a spending trend associated with the customer 103 and a geographical location of that transaction. Note that the spending trend and the geographical location are two factors, of a set of factors, that the promotion system 110 can utilize in the generation of the promotion. As discussed above, other factors, such as the promotion criteria associated with the set of selected merchants, can be factors included in the set of factors used by the promotion system 110. In various embodiments, the promotion system 110 can utilize any number of factors in the generation of promotions. In one example, the promotion system 110 utilizes only one factor to generate a promotion. In another example, the promotion system 110 utilizes ten factors in the generation of the promotion.

In some embodiments, the promotion system 110 determines the spending trend by identifying the specific purchase in the first purchase transaction 121 and an identifier identifying the customer 103, such as the payment card number of the payment card 106. The promotion system 110 further identifies the timestamp at which the first purchase transaction 121 occurs. The promotion system 110 correlates the past purchase items with the current purchase item based on the timestamp to determine the customer's spending trend.

In some embodiments, the promotion system can identify all other past purchases of the customer 103 by using the payment card number of the payment card 106. According to such embodiments, the customer 103 is required to have an account with the promotion system 110 ("promotion service account") before the promotion system 110 can identify the past purchases.

In some embodiments, the promotion service account is created by the customer 103 going through a registration process with the promotion system 110. In such embodiments, the customer 103 can register using a mobile application or an online website to communicate with the promotion system 110. In some embodiments, the promotion service account is created automatically for the customer 103 the first time the customer 103 utilizes the payment card 106 at a point-of-sale (POS) device that is associated with the promotion system 110 (e.g., the electronic device 104). Once the promotion service account is created, the promotion system 110 tracks and stores transaction history data of all transactions conducted by the customer 103. The transaction history data is stored in association with the payment card number of the payment card 106 of the customer 103. Note that any other identifier, other than the payment card number, such as an email address, a telephone number, a driver's license number, a social security number, etc. may be used.

Once the promotion system 110 has identified the spending trend, it selects a geographically proximate merchant that provides products and/or services correlated to the spending trend of the customer 103. In some embodiments, the promotion system 110 first identifies all geographically proximate merchants, such as merchants 102A-102N (where A is an integer of "1" and N is an integer greater than 1). The promotion system 110 can then filter the list of available merchants 102A-102N based on varying factors associated with the geographical location, the spending trend, or a combination thereof.

In some embodiments, the promotion system 110 filters the list of available merchants based on a predetermined distance of the geographical location. The predetermined distance can be another factor in the set of factors utilized by the promotion system 110 to generate the promotion, where the predetermined can be specified by a merchant or by an administrator of the promotion system 110. For example, merchants located outside of a "5-mi radius" of the first merchant location 120 are filtered out from the list of available merchants. In another example, only merchants within "1 city block" in each direction of the first merchant location 120 is selected. The filtered list of merchants, or selected set of merchants, is then utilized by the promotion system 110 in the generation of the promotion.

In some embodiments, the promotion system 110 further filters the filtered list of merchants based on the determined spending trend. In some embodiments, the promotion system 110 utilizes the spending trend factor in correlation with the time of the transaction, i.e., timestamp factor. For example, the promotion system 110 identifies that the current purchase item is a haircut service, that the current time and date is 11 AM on a Saturday, and that the customer 103 typically visits various service shops (e.g., dry cleaner, pharmacy, etc.) and a coffee shop on Saturday mornings (e.g., as indicated by coffee shop past purchases with timestamps throughout Saturday mornings). In such example, the promotion system 110 determines that the spending trend of the customer 103 indicates that he will likely want to purchase a coffee after the current visit at the first merchant location 120. The promotion system 110 then selects the merchant 102A as it is the only merchant to provide coffee within a predetermined distance from the geographical location of the first merchant location 120. In another example, the promotion system 110 selects the merchant 102B as it is the only coffee merchant that the customer 103 has not visited, and that the spending trend indicates that the customer 103 rarely visits the same coffee shop more than twice. In yet another example, the promotion system 110 may simply select a new coffee merchant (i.e., unknown to the customer) as a way to promote the new merchant.

In some embodiments, the different factors in the set of factors utilized by the promotion system 110 (e.g., predetermined distance, spending trend, predicted low-customer-volume time of day, timestamp, etc.) can each have an associated weight. For example, a merchant located five blocks away is selected in lieu of a merchant located next door because more weight is placed on the spending trend, which indicates that the customer 103 prefers merchants with ratings of "$$$" or more.

In some embodiments, the promotion system 110 filters the list of available merchants based on an established relationship between merchants (e.g., synergistic business relationships). For example, the promotion system 110 selects a merchant that serves deep dish pizza, as opposed to a merchant that serves regular pizza, in accordance with an established business relationship specified by the first merchant (e.g., a barber shop) and the deep dish pizza merchant, where the relationship is a factor submitted to the promotion system 110 for the generation of the promotion.

Once the promotion system 110 has analyzed the data associated with the set of factors, the promotion system 110 selects a second merchant, e.g., second merchant 102A based on the analysis. The promotion system 110 then generates a promotion that promotes the second merchant, where the promotion can be used in a transaction with the second merchant. In particular, the promotion system 110 generates a receipt for the first purchase transaction 121 and includes the generated promotion in that receipt for the customer 103. The receipt can be in a paper form or an electronic form (e.g., email or mobile application). In some embodiments, the promotion is generated to be included in a message other than a receipt, e.g., a follow-up survey, for example, sent in an email to the customer 103 after the first transaction.

As discussed above, the content (i.e., the "what") of the promotion can be specified by the second merchant 102A, or determined by the promotion system 110 based on a set of factors. The promotion can be specific to a product or service offered by the second merchant 102A (e.g., 20% off sunflowers) or it can be specific to just the second merchant 102A (e.g., 20% off anything of your choice when you visit). In some embodiments, the promotion can include a time incentive where the promotional value decreases with a passage of time (e.g., 20% if redeemed within the next 30 min. and 10% if redeemed within the next hour).

In some embodiments, the promotion can be in the form of a promotion identifier (e.g., a QR code, a bar code, or an identification number). In such embodiments, the customer 103 can redeem the promotion by showing, e.g., the receipt from the first purchase transaction 121 with the first merchant 101 to the merchant 102A in the second purchase transaction 122. In some embodiments, the promotion can be linked to the payment card 106 of the customer 103. In such embodiments, the customer 103 can redeem the promotion simply by using the same payment card 106 with the second merchant 102A in the second purchase transaction 122.

Note that while the identifier associated with the customer is a payment card number in the above provided example, other identifiers identifying the customer may be utilized in executing the various embodiments of the disclosed technology. Additionally, in the embodiment discussed above, the electronic device 104 includes a mobile payment application that is associated with a promotion system (e.g., promotion system 110). However, in other embodiments, the electronic device 104 can be a point-of-sale (POS) device independent from the promotion system (e.g., a cash register with communication only to the merchant's transaction system). In such embodiments, the independent POS device can communicate the transaction data to the merchant's transaction system, which relays the information to the promotion system 110 in various ways. For example, an administrator of the merchant's transaction system can compile the transaction data associated with the redeemed promotions, e.g., into an excel formatted document, and transmits the excel document to an administrator of the promotion system 110 (e.g., by email, by fax, by postal mail, etc.).

Figure 2:
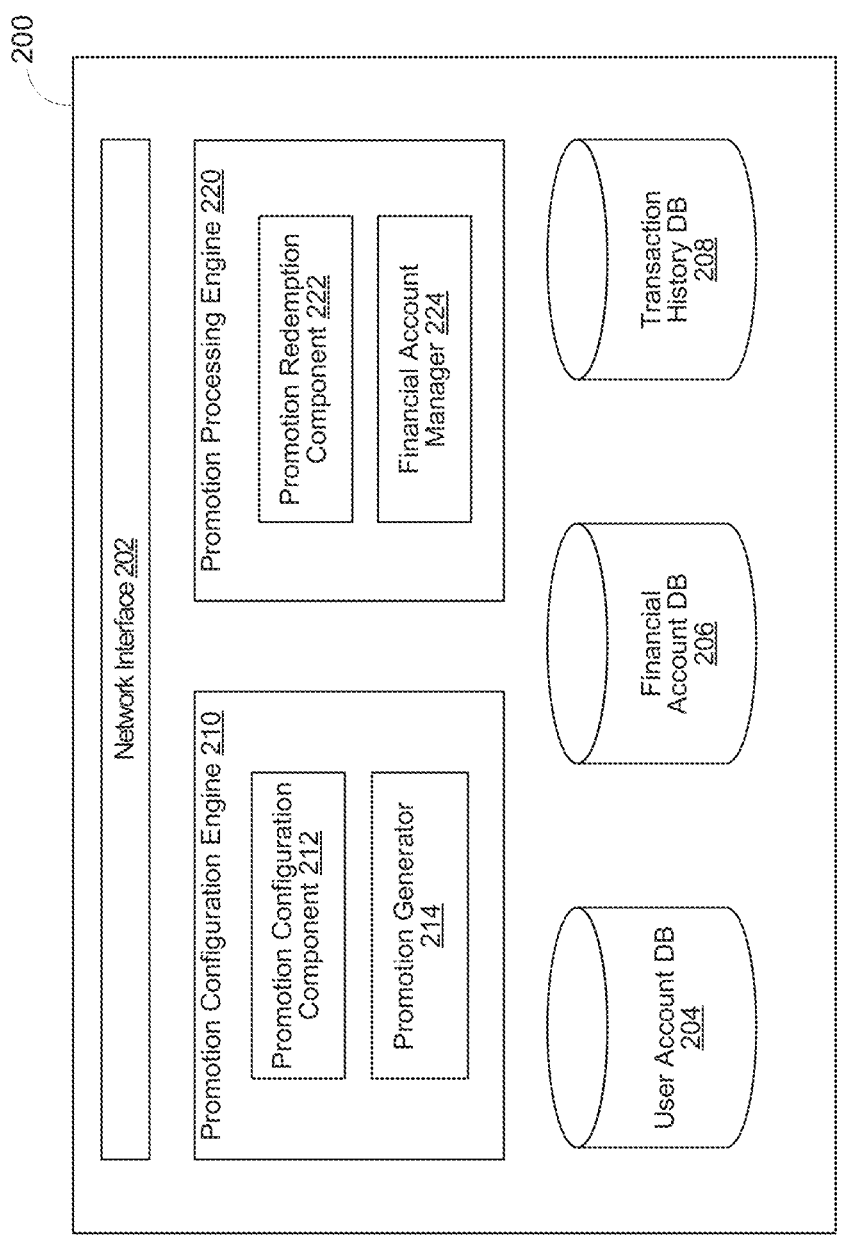
FIG. 2 is a block diagram illustrating an example promotion system that can be used in facilitating the generation and processing of the customized promotion.

FIG. 2 is a block diagram illustrating an example promotion system 200 that can be used to facilitate the generation and processing of a customized promotion. In some embodiments, the example promotion system 200 can be the promotion system 110 of FIG. 1. According to various embodiments, the promotion system 200 includes a network interface 202, a promotion configuration engine 210, and a promotion processing engine 220. In the embodiment illustrated in FIG. 2, the promotion system 200 also includes a user account database 204, a financial account database 206, and a transaction history database 208, all of which operate as storage for various data utilized by the promotion system 200 in facilitating the generation and processing of promotions (e.g., data associated with a set of factors that are correlated to determine the what, when, where, and how to generate the promotion). Other configurations are also possible in other embodiments.

The network interface 202 can be a networking module that enables the promotion system 200 to communicate in a network with an entity that is external to the promotion system 200, through any known and/or convenient communications protocol supported by the promotion system 200 and the external entity. The network interface 202 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

The promotion configuration engine 210 includes a promotion configuration component 212 and a promotion generator 214. The promotion configuration component 212 is configured to receive user inputs, e.g., various criteria, or factors, submitted by a merchant, to specify the content and/or configuration of the promotion to be generated by the promotion system 200. For example, the merchant can specify the target demographics (e.g., working professionals between the age of 22 and 35), the target item(s) that the particular merchant is willing to offer a promotion, the promotional value, the predicted low-volume time of day (e.g., weekday afternoons when there is a low volume customer traffic), the target merchant location (e.g., downtown Mountain View). In another example, the merchant can specify that the promotion be generated and sent out to customers only on weekdays. In yet another example, the merchant can simply specify that the merchant wants an increase in customer volume at a specific merchant location, e.g., regardless of time, demographics, item type, etc.

The promotion configuration component 212 is also configured to receive inputs in the form of transaction data. The promotion system 200 can analyze the data for correlations based on various factors in order to generate one or more promotions. In some embodiments, the transaction data can be received from a remote computer system that facilitates one or more point-of-sale (POS) devices of a merchant (e.g., a merchant transaction system or merchant POS system). For example, a mobile promotion application installed on a POS device of a first merchant (e.g., the first merchant 101 of FIG. 1) facilitates a first transaction between the first merchant and the customer, and upon payment by the customer, sends the transaction information associated with the first transaction to the promotion system 200 via the network interface 202. The promotion configuration component 212 of the promotion system 200, in this example, receives the transaction data for generation of a receipt (i.e., record of the first transaction) and a promotion to be included in the receipt. The receipt can be in a paper form or an electronic form.

In some embodiments, the transaction data can also be received from an administrator of the promotion system 200 and/or of the remote computer system, e.g., manually submitting the information to the promotion system 200. For example, the administrator is a sales representative that faxes the promotion criteria to a promotion service representative, who then submits the information through the promotion configuration component 212.

The promotion generator 214 is configured to generate one or more promotions for a particular merchant using the data received from the promotion configuration component 212. For example, the promotion configuration component 212 transmits the transaction data associated with a first merchant to the promotion generator 214. The promotion generator 214 parses the data to identify, for example, a transaction item description, a transaction price, a transaction timestamp, a transaction payment information (e.g., payment card number), a geographical location of the transaction, and the like. The promotion generator 214 can use the parsed information to determine various factors, such as a spending trend of the customer involved in the transaction. Based on the spending trend and/or any other factors, the promotion generator 214 selects a merchant for which to generate the promotion. The merchant is selected, for example, for being located within a predetermined distance of a geographical location of a particular merchant and for providing a product or service associated with the customer's spending trend. The generated promotion, as a result, is based on a set of one or more factors determined based on the data received from the promotion configuration component 212.

After the promotion generator 214 generates the promotion, it embeds the promotion into a receipt for transmission to the customer to provide a transactional record for the first transaction. In some embodiments, the promotion generator 214 sends the generated promotion to a receipt generator (not shown) of a remote receipt system (not shown), which then sends the receipt to the customer. In such embodiments, the promotion generator 214 and the receipt generator can be part of a networked system (e.g., a payment service system) that includes the promotion system 200 and the receipt system. In some embodiments, the promotion generator 214 itself generates and transmits the receipt for the first transaction, in addition to generating the promotion. In such embodiments, the promotion generator 214 operates to service the receipt generating needs of merchants in general, and provides the additional benefits of including customized promotions that can help different merchants cross-sell.

The promotion processing engine 220 is configured to facilitate the processing, or redemption, of one or more promotions created by the promotion configuration engine 210. The promotion processing engine 220 includes a promotion redemption component 222 and a financial account manager 224. The promotion redemption component 222 is configured to process a redemption of a promotion in a transaction. The financial account manager 224 is configured to communicate (e.g., request/receive/send payment) with one or more financial service systems such as, for example, a financial service system associated with a customer, a merchant, etc.). The financial account manager 224 is also configured to identify the financial service systems associated with the various users (e.g., customer and/or merchant) of the promotion service facilitated by the promotion system 200, e.g., in order to fulfill redemption of promotions.

In some embodiments, in processing the promotion, the promotion redemption component 222 applies the promotional value of the promotion to a transaction item purchased in the second transaction with the "promoted" merchant. In such embodiments, the promotion redemption component 222 communicates with the financial account manager 224 to identify the customer's financial account. In particular, the promotion redemption component 222 indicate to the financial account manager 224 the promotional value being redeemed and the identifier of the customer. The financial account manager 224 utilizes the customer identifier to find a financial account associated with the identifier. For example, the customer identifier is an email address stored in association with a payment card number that identifies the customer's financial account. In another example, the customer identifier is the payment card number itself. Once the customer's financial account is identified, the financial account manager 224 initiates for a payment amount indicative of the promotional value to be transferred to the customer's financial account. For example, the financial account manager 224 communicates with a financial system that facilitates the financial institution associated with the customer's financial account and causes the payment amount to be debited.

In some embodiments, in processing the promotion, the promotion redemption component 222 works with the financial account manager 224 to determine and distribute, to the first merchant, a portion of a payment tendered by the customer for the second purchase item in the second transaction. In such embodiments, the promotion redemption component 222 determines the appropriate portion to be distributed to the first merchant, e.g., as part of a business agreement between the first merchant and the second merchant for placing the promotion on the receipt associated with the first merchant. The promotion redemption component 222 communicates the appropriate portion and the identity of the first merchant to the financial account manager 224. The financial account manager 224 identifies a financial account associated with the first merchant and causes a payment amount indicative of the appropriate portion to be transferred to the first merchant's financial account (e.g., debit or credit rails).

In some embodiments, the promotion system 200 is also configured to facilitate establishing, maintaining, and configuring the promotion-related relationships between the different merchants by providing, for example, a web interface allowing merchants to connect with (e.g., invite, search, advertise, and/or otherwise locate) other geographically proximate merchants to establish the relationships. For example, the promotion configuration engine 210 can direct the promotion system 200 to provide a configuration interface to a particular merchant for identifying potential other merchants to establish synergistic relationships. In this example, the potential other merchants can be geographically proximate merchants or those located in a different geographical area, but may, for example, offer services and/or goods that are complementary to the particular merchant. The promotion-related relationships can specify certain criteria for generating the promotions. In some embodiments, these criteria are received by the promotion generator 214, which utilizes the criteria in determining the content and/or configuration of the promotion to be generated.

One or more components and/or modules of the promotion system 200 can be implemented on the electronic device 104 of FIG. 1. Likewise, one or more components and/or modules of the electronic device 104 can be implemented on the promotion system 200. Additionally, in various embodiments, the functionality of the electronic device 104 and the promotion system 200 can be implemented in a single device or co-located (e.g., at a merchant's location).

Figure 3:
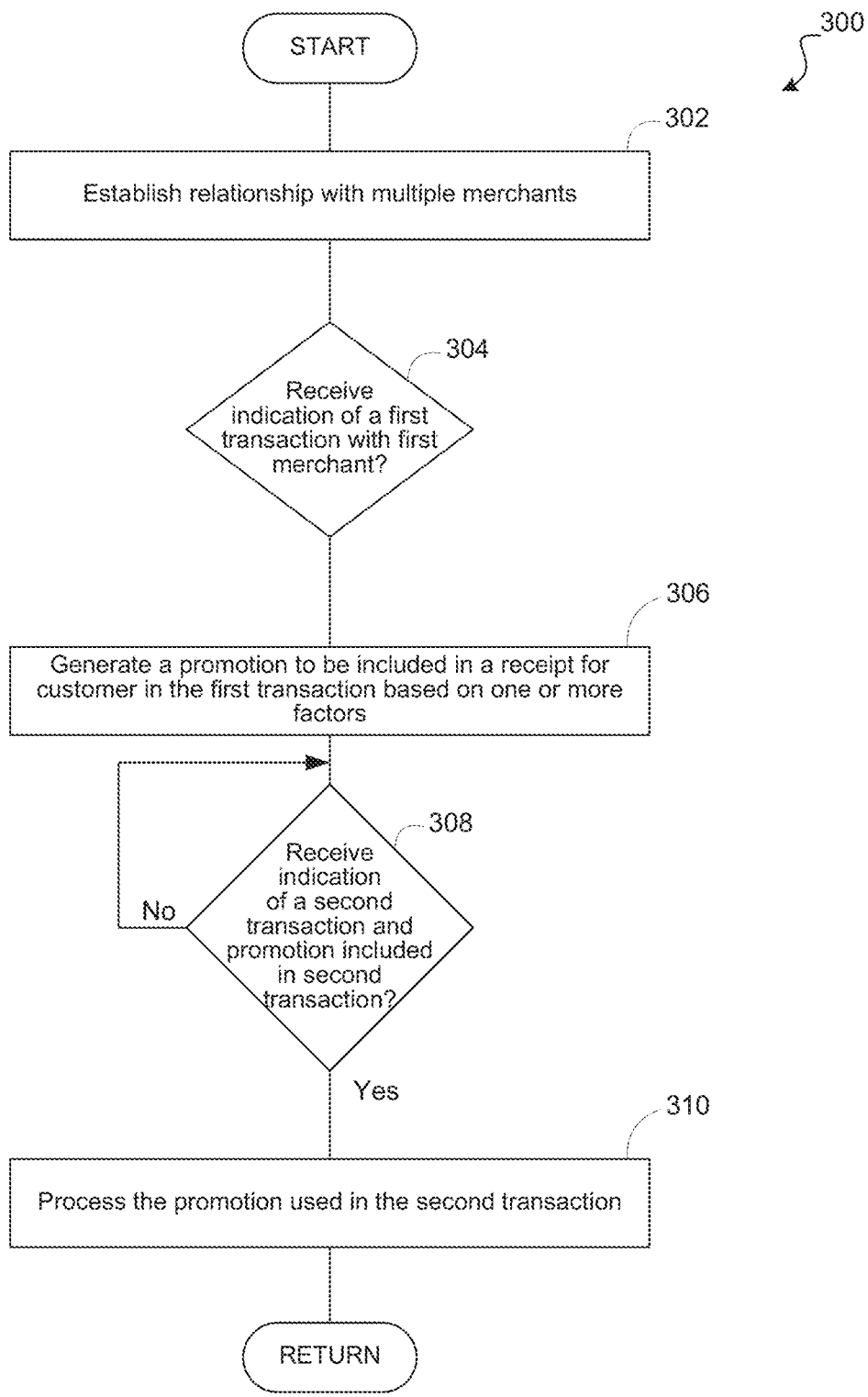
FIG. 3 is a flow chart illustrating example processes of facilitating the generating and processing the customized promotion.

FIG. 3 is a flow chart illustrating example processes 300 of facilitating the generating and processing the customized promotion. The processes 300 can be performed by a promotion system such as, for example, the promotion system 130 of FIG. 1 or the promotion system 200 of FIG. 2.

At block 302 of FIG. 3, the promotion system establishes a relationship between multiple merchants for the generation and processing of promotions ("promotion relationship"). The established relationship can be, for example, one factor of a set of factors considered by the promotion system when generating the promotion. In some embodiments, the promotion system provides an interface that allows different merchants to connect with one another to establish the promotion relationships. In some embodiments, the different merchants can choose to establish the promotion relationships between specific merchants with merchant locations that are geographically proximate (e.g., two franchise merchants with stores that are located in the same downtown area). In some embodiments, the promotion system can identify potential merchants to establish the relationships as recommendations displayed (e.g., via the interface) to the different merchants (e.g., to select and establish a promotion relationship). The potential other merchants can be geographically proximate merchants or those located in a different geographical area, but may, for example, offer services and/or goods that are complementary to the particular merchant.

In some embodiments, the promotion system provides an interface that allows a particular merchant to register with the promotion system to establish a promotion relationship with any merchant(s). That is, in such embodiments, the particular merchant simply signs up to be a part of the promotion program, facilitated by the promotion system, to have one or more promotions (about its product/service) be placed in any other merchant's receipt. Once a promotion relationship is established (e.g., a merchant either registers to indicate interest in the promotion program or to indicate specific merchants with whom to participate in the program), the promotion system can facilitate the generation and/or redemption of the promotion between the different merchants.

In some embodiments, the promotion relationships can specify certain rules, or criteria, for generating the promotions. For example, the promotion relationship can indicate goods or services that a second merchant is willing to provide in its promotion(s) for redemption by a customer of a first merchant. In another example, promotion relationship can indicate a promotional value (e.g., how much of a discount that the second merchant is willing to offer in the promotion to the customer of the first merchant.

In some embodiments, the promotion relationship can also indicate an exchange of payment by the second merchant to the first merchant for placement of the promotion into the receipt for various transactions between the first merchant and its customers. For example, the relationship can indicate a payment amount to the first merchant for the placement of the promotion. In such example, the promotion system can distribute a portion of a payment in second transaction (that is actuated based on the promotion placement) to the first merchant, e.g., after receiving notification that the second transaction has occurred at the second merchant location and/or notification that the promotion has been redeemed in the second transaction at the second merchant location.

At block 304, the promotion system begins facilitating the generation and redemption of the promotions, in accordance with the one or more promotion relationships established at block 302. In particular, at block 304, the promotion system receives an indication that a first transaction has occurred at a first merchant location of a first merchant (e.g., a first merchant's coffee shop in downtown Palo Alto, CA), where the first merchant has registered to have its promotion be placed on any other merchant's receipt (as selected by the promotion system (e.g., at block 302). For example, a customer buys a coffee at a coffee shop. In some embodiments, the first transaction is instantiated on a POS device (e.g., of a merchant's transaction system) through a mobile promotion application executing on the POS device. The mobile promotion application can be associated with the promotion system, which facilitates various tasks and/or functions to be carried out by the mobile promotion application.

In some embodiments, the indication can include transaction data related to the purchase made in the first transaction. For example, the transaction data includes a purchase item description, a purchase price, and a payment card number of a card used to purchase the item in the first transaction. In another example, the transaction data also includes an email address of the customer (e.g., for sending a receipt of the first transaction to the customer). In yet another example, the transaction data includes a telephone number of the customer (e.g., for sending, via text, a receipt of the first transaction to the customer). In some embodiments, the transaction data can be transmitted by the mobile promotion application (as discussed above). In such embodiments, the transaction data can be transmitted substantially instantaneously after the customer approves the payment for the first transaction (e.g., within less than 1 second, within 5 seconds, within 1 minute, etc.).

At block 306, the promotion system, responsive to the indication, generates a receipt for the first transaction and a promotion to be included in the receipt. The promotion system generates the promotion based on one or more factors. For example, the factors can be associated with multiple merchants that have requested for their respective product(s) or service(s) to be included in the receipt with the first merchant. The multiple merchants can be merchants that have established a promotion relationship with the first merchant (e.g., at block 302), or simply merchants that have indicated to the promotion system that they want to receive placement of promotions and/or place the promotions. Additional details regarding block 306 will be discussed below with reference to FIG. 4.

At decision block 308, the promotion system monitors and determines whether it has received a second indication of a second transaction that has occurred at a second merchant location. In particular, the promotion system determines whether that second transaction includes the promotion generated at block 306. In some embodiments, the second indication can include transaction data related to the purchase made in the second transaction. For example, the transaction data includes a purchase item description, a purchase price, and/or a payment card number of a card used to purchase the item in the second transaction. In another example, the transaction data also includes an email address of the customer (e.g., for sending a receipt of the second transaction to the customer). In yet another example, the transaction data includes a telephone number of the customer (e.g., for sending, via text, a receipt of the second transaction to the customer).

In some embodiments, the transaction data can be transmitted by a mobile promotion application installed on a POS device of the second merchant (e.g., the mobile promotion application utilized by the first merchant, as discussed above). In such embodiments, the transaction data can be transmitted substantially instantaneously after payment is approved for the second transaction (e.g., within less than 1 second, within 5 seconds, within 1 minute, etc.).

In some embodiments, the transaction data can be transmitted by the second merchant's transaction system. For example, a bookstore merchant has a customized transaction system that includes a built-in component and/or subsystem that is communication with one or more POS devices located at various second merchant locations (including the location at which the second transaction has taken place). In an example, the bookstore's customized transaction system is not in communication with the promotion system, and as such, can have an administrator or operator (e.g., an employee of the second merchant) compile the transaction data (e.g., in a Microsoft® Excel® document) and transmit the Excel® document to an administrator or operator of the promotion system. The promotion system administrator inputs the received transaction data into the promotion system to carry out functions and/or tasks related to redeeming the promotion, e.g., the functions and/or tasks as discussed in block 310 and/or in FIG. 5.

Referring back to decision block 308, if the promotion system determines that it has received indication that a second transaction, which includes the generated promotion, has occurred, the promotion system proceeds to block 310 to process the promotion. Additional details regarding block 310 will be discussed below in reference to FIG. 5. If the promotion system determines there is no indication that a second transaction, in which the promotion is used, has occurred, the promotion system continues monitoring, as indicated in block 308.

Figure 4:
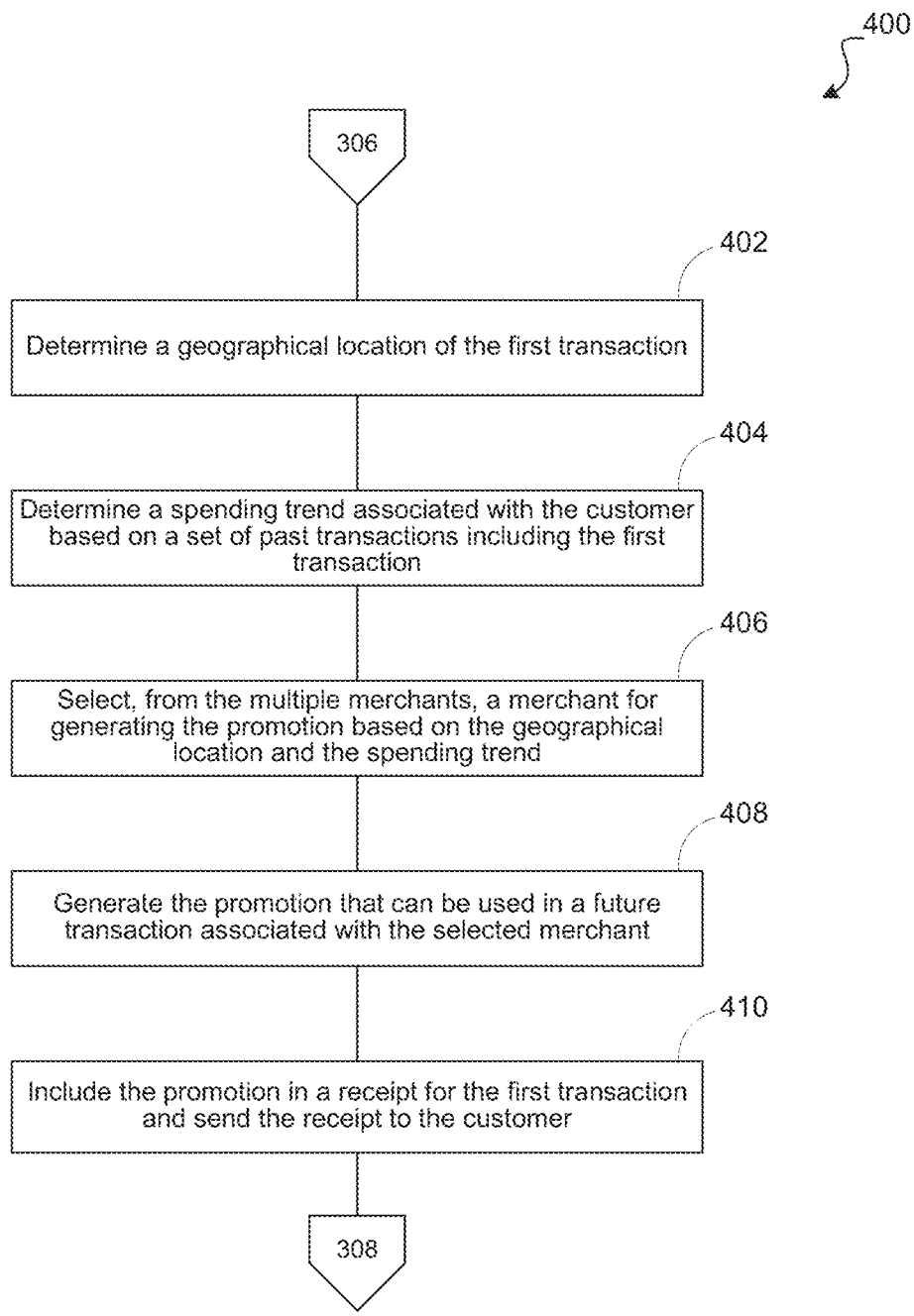
FIG. 4 is a flow chart illustrating example process of generating the customized promotion.

FIG. 4 is a flow chart illustrating example process 400 of generating the customized promotion. The process 400 expands on the details of block 306 of FIG. 3, in accordance with some embodiments of the disclosed technology. In the embodiment of FIG. 4, the promotion system starts the process 400 by parsing and/or analyzing the transaction data in the transaction with the first merchant (i.e., "first transaction") to determine various pieces of information about the first transaction, such as those indicated in blocks 402-406.

At block 402, the promotion system determines a geographical location of the first transaction. In particular, the promotion system parses the transaction data of the first transaction to determine GPS coordinates and/or any other location-related information that indicates a geographical location at which the first transaction take place. The promotion system can utilize the identified geographical location to determine the physical location of the customer (i.e., "where" is the customer). Knowledge of the geographical location can help the promotion system in generating the customized content and/or customized configurations of the promotion to provide for the customer, where the customized promotion will likely have a higher efficacy in incentivizing the customer to visit a second merchant. For example, the geographical location helps the promotion system filter a list of merchants from which to select in generating the promotion (e.g., merchants in Union Square, San Francisco, CA). In another example, the geographical location helps the promotion system determine a spending trend of the customer involved in the first transaction. In another example, the geographical location helps the promotion system determine one or more merchants that may not be geographically proximate, but offer, for example, services and/or goods that are complementary to the first transaction and/or the first merchant (e.g., San Francisco's Bay Aquarium and Monterey Bay Aquarium).

At block 404, the promotion system determines a spending trend of the customer. In some embodiments, the spending trend can be determined based on an identifier associated with the customer. In some embodiments, the spending trend can be determined based on an transaction item description indicating the items purchased in the first transaction by the customer (e.g., a product or a service). In some embodiments, the spending trend can be determined based on a timestamp of the first transaction (i.e., "when" does the first transaction take place). In some embodiments, a combination of the transaction item description, the identifier, and/or the timestamp is utilized in determining the spending trend.

In various embodiments, the promotion system parses the transaction data of the first transaction to identify the purchased item(s), the timestamp, the geographical location, and/or the customer identifier. The transaction item description can indicate, for example, a coffee and two breakfast pastries are purchased in the first transaction. The timestamp can be, for example, "Aug. 3, 2014, 11 AM" to indicate the coffee and pastries are purchased on a Sunday morning. The identifier can be, for example, a telephone number submitted by the customer to indicate how she wants to receive her receipt for the first transaction with the first merchant. The geographical location can be Union Square, San Francisco, CA, as indicated by GPS coordinates included in the transaction data.

In some embodiments, the promotion system accesses a database of the promotion system (e.g., repository 205 of FIG. 2) to identify a set of past transaction data associated with the customer identifier (e.g., identified by parsing the transaction data of the first transaction). The set of past transaction data has been previously associated with the identifier in a set of past transactions that the promotion system has facilitated. In particular, the promotion system can facilitate all transactions that take place on POS devices of various merchants (e.g., merchants that render different products and/or services from one another), in exchange for a service fee from the respective merchant(s). The promotion system performs various functions and/or tasks to facilitate the different transactions (e.g., processing payments, generating receipts, etc.) by communicating with a mobile application. The mobile application is installed on a POS device of a respective merchant that utilizes the facilitation service executed by the promotion system. Accordingly, the promotion system has access to transaction data across different merchants, thereby allowing it to perform an analysis on a customer based on varying purchases. The promotion system uses the customer identifier to identify which past transactions are carried out by the customer identifier to analyze the spending trend.

Once the set of one or more past transactions has been identified, the promotion system identifies past transaction items (from the set of past transaction data) that the customer has purchased. The promotion system also identifies the transaction items purchased in the first transaction (e.g., by looking at the item description included in the transaction data). The promotion system then correlates the identified set of past transaction items with the identified first transaction item based on the timestamp of the first transaction. For example, the promotion system identifies that the purchase item in the first transaction is a coffee, that the time and date of the first transaction is 11 AM on a Sunday, and that the customer typically goes to a bookstore on Sunday afternoons (e.g., as indicated by past book purchases with timestamps on Sundays between 12 PM to 4 PM). In such example, the promotion system determines that the spending trend of the customer indicates that she will likely want to visit a bookstore after the current visit at the coffee shop.

At block 406, the promotion system selects a merchant, from a list of available merchants (e.g., all merchants located within Union Square, San Francisco, CA), to generate the promotion for the customer. The promotion system selects the merchant based on the determined geographical location and the determined spending trend. In some embodiments, the promotion system may select a specific bookstore merchant that the customer has not visited. In some embodiments, the promotion system may select a specific bookstore merchant that the coffee store has a relationship established.

At block 408, the promotion system generates a promotion that can be used in a second transaction with the selected merchant in block 406. The promotion system can then generate a receipt that includes the newly generated promotion, where the receipt is for the first transaction with the first merchant, as indicated in block 410.

The promotion system can transmit the receipt to the customer. In one example, the promotion system sends an email (with the receipt for the first transaction) to the customer (e.g., the customer's mobile device). In another example, the promotion system transmits the receipt to the first merchant's POS device (e.g., mobile application installed on the POS device) so that the first merchant can print the receipt for the customer. In yet another example, the promotion system transmits the receipt to a mobile application installed on the customer's mobile device (e.g., iPhone®). Accordingly, the customer, who has just completed the first transaction with the first merchant, can receive, on her receipt with the first merchant, a promotion for a future transaction with another merchant. As the promotion is customized based on the geographical location and spending trend, the customer has more incentive to visit the second merchant after seeing the promotion.

In some embodiments, the promotion system generates the promotion in the form of a promotion identifier. The promotion identifier is associated with the selected second merchant and can be included in a receipt of the first transaction. The promotion identifier can be a bar code, a number, or a QR code. The promotion identifier is indicative of the promotion that can be redeemable with the selected second merchant in a future transaction (e.g., a second transaction after the customer leaves the first merchant location).

In some embodiments, the promotion system stores an association between the customer identifier and the promotion identifier. Such stored association allows the customer to redeem the promotion, identified by the promotion identifier, in a future transaction by simply providing the customer identifier to a merchant. Further details of redemption of the promotion by provision of the identifier will be discussed with reference to FIG. 5.

Figure 5:
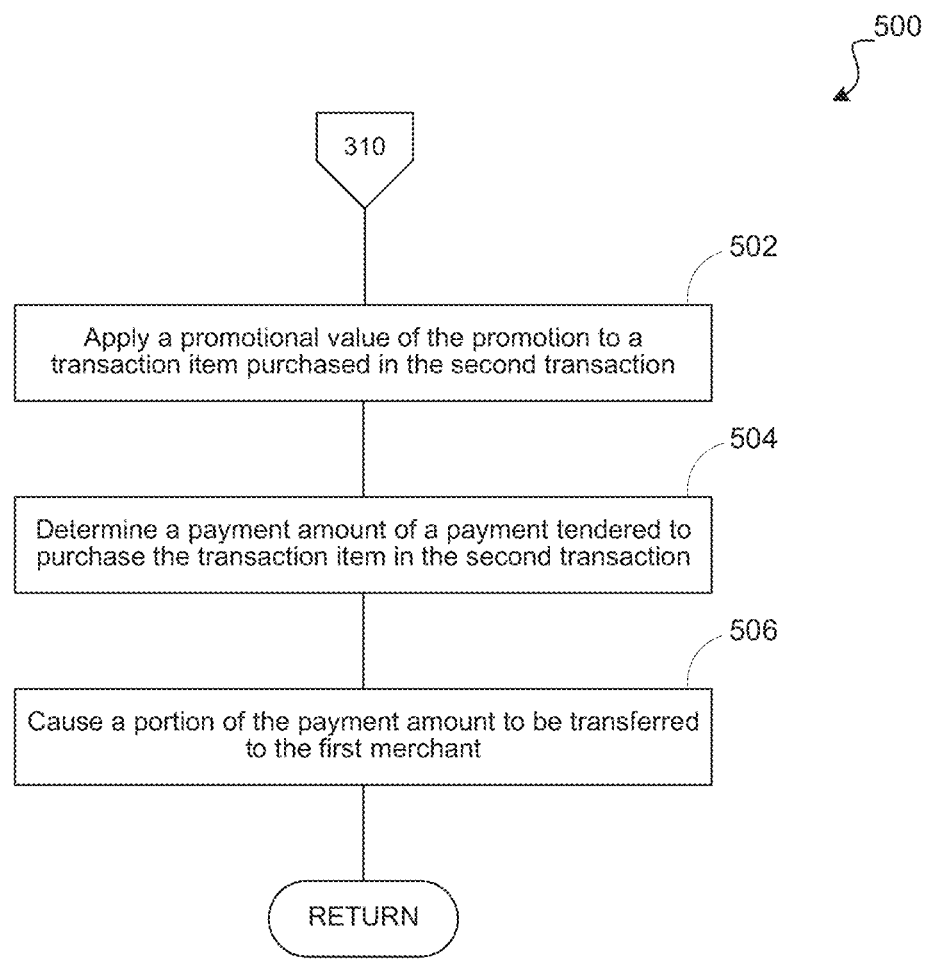
FIG. 5 is a flow chart illustrating example process of processing the customized promotion.

FIG. 5 is a flow chart illustrating example process 500 of processing the customized promotion. FIG. 5 expands on the details of block 310 of FIG. 3, in accordance with some embodiments of the disclosed technology. In the embodiment of FIG. 5, the process 500 starts when the promotion system has received an indication regarding the occurrence of a second transaction (i.e., block 308), where the promotion generated in block 306 of FIG. 3 is used with the selected second merchant at the second merchant location. In some embodiments, the indication includes transaction data related to the second transaction. The transaction data can include, for example, purchase item description indicating what was purchased (i.e., purchase items in the second transaction), the payment amount for the purchased items, and an identifier of the customer of the second transaction. The promotion system parses and/or analyzes the received transaction data to determine various pieces of information in processing the promotion for the customer in the second transaction, such will be described with references to blocks 502-506 below.

At block 502, the promotion system identifies the promotion, the transaction item(s) associated with the promotion, and applies the promotional value of the promotion to the item(s). For example, the promotion is for "10% Off" every New York Times Bestseller book purchased, and the customer has purchased two New York Times Bestseller books and a coffee mug at the bookstore. As such, the promotion system identifies the two books and applies the 10% Off to the purchase price of each book (but not to the coffee mug). In some embodiments, the promotion system identifies the promotion based on the promotion identifier. For example, the customer presents a QR code in a receipt email received in her first transaction at the coffee shop, where the QR code is scanned to redeem the promotional value. The QR code is sent, as part of, or along with, the transaction data, to the promotion system. In some embodiments, the promotion system identifies the promotion based on the identifier of the customer. For example, the promotion system receives a telephone number in the transaction data of the second transaction, determines whether there is a promotion stored in association with the telephone number, and processes the promotion (if found, based on the telephone number).

In some embodiments, the promotion system identifies a timestamp of the second transaction in order to determine the promotional value of the promotion. In such embodiments, the promotion is configured to decrease incrementally in promotional value in accordance with the passage of time. For example, the 10% can decrease to 5% if redeemed more than 2 hours after the first transaction, and can decrease to 0% if more than 3 hours (i.e., "expired"). Such incremental decrease in value provides an incentive for the customer to visit the second merchant as soon as possible in order to enjoy the full promotional value. The promotion system determines the promotional value by calculating the change in time between the first timestamp associated with the first transaction (in which the promotion is generated) and the second timestamp associated with the second transaction (in which the promotion is applied, or redeemed).

In some embodiments, the promotion system, after it has applied the promotional value, can provide notification about the applied promotion (i.e., notification of the redemption). For example, the promotion system generates and transmits a notification message to the POS device of the second merchant. In another example, the promotion system generates a receipt for the second transaction, where the generated receipt reflects the application of the promotional value (i.e., redemption). In some embodiments, the promotion system transmits the receipt of the second transaction to the customer directly, e.g., via the customer's mobile device through an e-mail, a text message, or an interface of a mobile application associated with the promotion system. In some embodiments, the promotion system transmits the receipt of the second transaction to the second merchant, e.g., via the merchant's POS device. The second merchant can then print the receipt of the second transaction for the customer.

In some embodiments, the second merchant itself facilitates the payment for the second transaction in relation to the applied promotion. In such embodiments, responsive to receiving the notification of the redemption, the second merchant (e.g., second merchant transaction system) adjusts the amount it charges to the payment card of the customer for the second transaction, in order to reflect the promotional amount calculated and applied by the promotion system (e.g., provides the customer the 10% discount at check-out). The second merchant transaction system can also forward a service fee for the promotion to the promotion system (i.e., as payment for facilitating a promotion that results in bringing a customer to the second merchant location).

In some embodiments, the promotion system facilitates both the payment and the promotion for the second transaction on behalf of the second merchant. For example, in the example purchase of the books, the promotion system, after calculating the promotional value, causes an amount equivalent to the promotional value to be deposited into a financial account of the customer. This can be done, for example, by the promotion system identifying a financial account that is associated with the customer's identifier received in the transaction data of the second transaction. In such example, it is required that the customer has an account with the promotion system. In registering for the account, the customer provides financial account information, such as a payment card number, expiration date, security code, etc., and a user identifier, such as an email address or telephone number, to the promotion system. The promotion system, in turn, stores the financial account information in association with the identifier. Once it identifies the financial account of the customer, the promotion system causes the promotional amount to be transferred from a financial account of the promotion system to the financial account of the customer (e.g., debit rails or credit rails).

In some embodiments, the process 500 continues to block 504, where the promotion system determines the amount tendered for the item(s) associated with the promotion in the second transaction. The promotion system determines this payment amount in order to execute a relationship agreement between the first and second merchant (e.g., a quid-pro-quo agreement). At block 506, the promotion system causes a portion of the payment amount to be distributed to the first merchant for a successful result of the promotion (e.g., the customer visits the second merchant location to make a purchase, the customer visits the second merchant location to make a purchase of item X, the customer visits the second merchant location to make 5 purchases of item Y, etc.). In particular, at block 506, the promotion system determines the portion of the payment amount based on what has been specified by the agreement between the first and second merchants. The process 500 returns after block 506.

Figure 6:
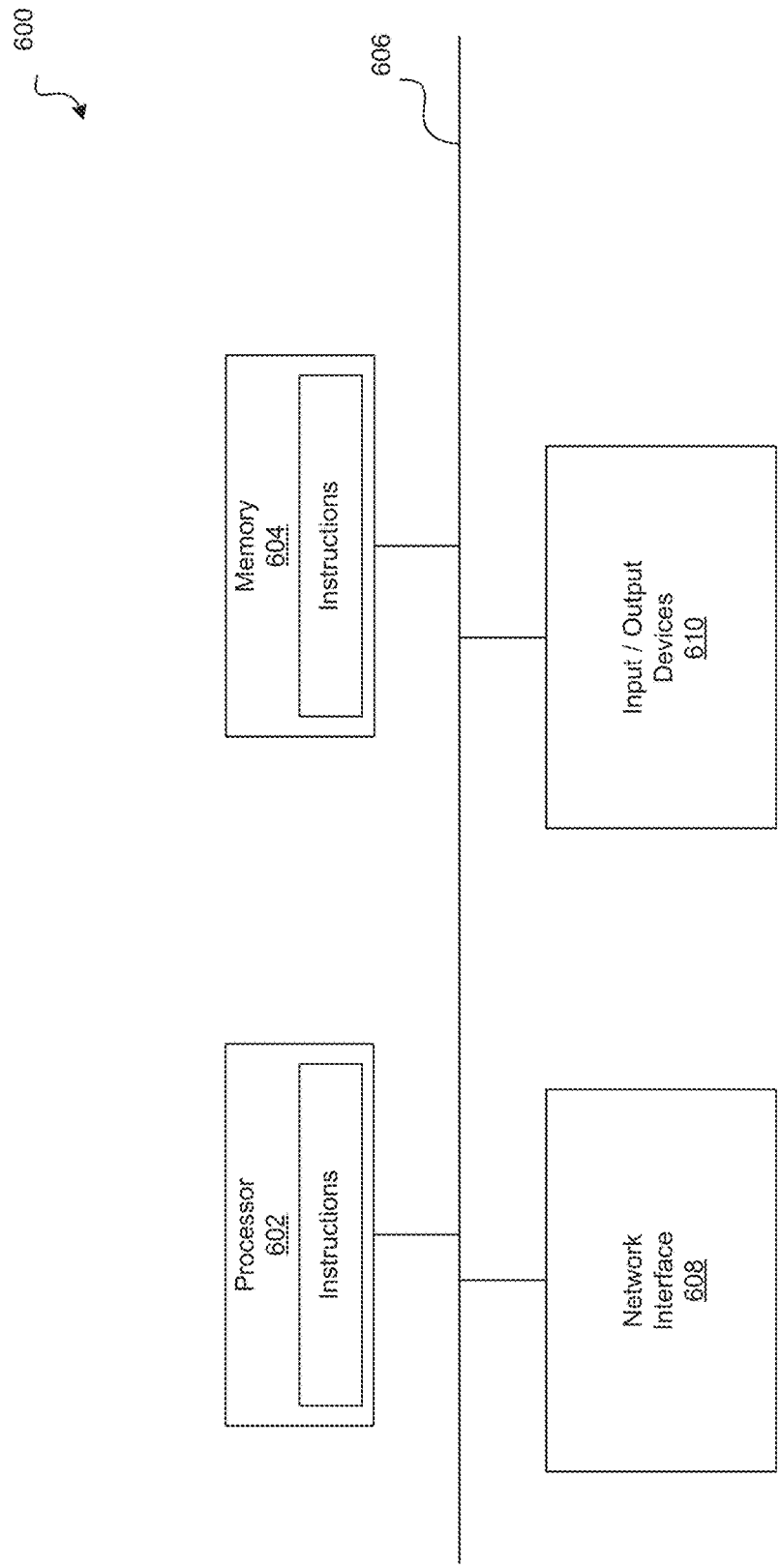
FIG. 6 is a high-level block diagram illustrating an example computer system that can represent any of the devices described above for use in implementing various embodiments of the disclosed technology.

FIG. 6 is a high-level block diagram illustrating an example of a computer system 600 that can represent any of the devices described above, such as the electronic device 104 and the promotion system 110. In alternative embodiments, the computer system operates as a standalone device or can be connected (e.g., networked) to other computer systems. In a networked deployment, the computer system can operate in the capacity of a server or a client computer in a client-server network environment, or as a peer computer in a peer-to-peer (or distributed) network environment.

The computer system 600 can be a server computer, a client computer, a personal computer (PC), a mobile electronic user device, a tablet PC, a laptop computer, a set-top box (STB), a personal digital assistant (PDA), a cellular telephone or a smart phone (e.g., an iPhone or an Android phone), a web-enabled household appliance, a network router, switch or bridge, a (hand-held) gaming device, a music player, or any computer capable of executing a set of instructions (sequential or otherwise) that specify actions to be taken by that computer.

In the illustrated embodiment, the computer system 600 includes one or more processors 602, one or more memories 604, a network interface device 608, and one or more input/output devices (I/O) devices 610, all coupled to each other through an interconnect 606. The interconnect 606 can be or include one or more conductive traces, buses, point-to-point connections, controllers, adapters and/or other conventional connection devices.

The processor(s) 602 can be or include, for example, one or more general purpose programmable microprocessors, microcontrollers, application specific integrated circuits (ASICs), programmable gate arrays, or the like, or a combination of such devices. The processor(s) 602 control the overall operation of the processing device 600.

The one or more memor(ies) 604 can be or include one or more physical storage devices, which can be in the form of random access memory (RAM), read-only memory (ROM) (which can be erasable and programmable), flash memory, miniature hard disk drive, or other suitable type of storage device, or a combination of such devices. The one or more memor(ies) 604 can store data and instructions that configure the processor(s) 601 to execute operations in accordance with the techniques described above.

The network interface device 608 enables the computer to mediate data in a network with an entity that is external to the host server, through any known and/or convenient communications protocol supported by the host and the external entity. The network interface device 608 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The input/output devices (I/O) devices 610 can include devices such as a display (which may be a touch screen display), audio speaker, keyboard, mouse or other pointing device, microphone, camera, etc., depending on the specific nature and purpose of the computer system 600.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

As used herein, a "module," "a manager," an "interface," a "platform," or an "engine" includes a general purpose, dedicated or shared processor and, typically, firmware or software modules that are executed by the processor.

Depending upon implementation-specific or other considerations, the module, manager, interface, platform, or engine can be centralized or its functionality distributed. The module, manager, interface, platform, or engine can include general or special purpose hardware, firmware, or software embodied in a computer-readable (storage) medium for execution by the processor.

The software or firmware to implement the techniques introduced here may be stored on a machine-readable storage medium and may be executed by one or more general-purpose or special-purpose programmable microprocessors. As used herein, a "computer-readable medium" or "machine-readable medium" includes any mechanism that can store information in a form accessible by a machine (i.e., a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random access memory (RAM), magnetic disk storage media, optical storage media; flash memory devices, non-volatile (NV) storage, etc.).

While some aspects of the disclosed technology are presented below in some claim forms, various aspects of the disclosed technology is contemplated in any number of claim forms. For example, while only one aspect of the disclosed technology may be recited as a means-plus-function claim under 35 U.S.C. § 112, ¶6, other aspects can likewise be embodied as a means-plus-function claim, or in other forms, such as being embodied in a computer-readable medium. Accordingly, the applicant reserves the right to add additional claims after filing the application to pursue such additional claim forms for other aspects of the disclosure.

What is claimed is:

1. A system comprising:
   one or more processors; and
   one or more non-transitory computer-readable media storing instructions executable by the one or more processors, wherein the instructions program the one or more processors to perform operations comprising:
   based at least in part on first transaction data associated with transactions of a plurality of merchants, identifying, by a payment service, a first merchant and a second merchant of the plurality of merchants as complementary merchants;
   generating, by the payment service, a recommendation for the first merchant and the second merchant to participate in at least one cross-merchant promotion;
   receiving, by the payment service, an indication that the first merchant and the second merchant intend to participate in the at least one cross-merchant promotion;
   receiving, by the payment service, second transaction data associated with a second transaction associated with the first merchant, wherein the second transaction data includes a payment card number of a payment card offered for payment in the second transaction;
   based at least in part on the payment card number, determining to apply the at least one cross-merchant promotion to the second transaction based on a transaction history of a customer associated with the payment card number;
   processing a payment associated with the second transaction, wherein the payment is based at least in part on the at least one cross-merchant promotion; and
   apportioning, by the payment service, the payment between the first merchant and the second merchant according to an agreement between the first merchant and the second merchant.

2. The system as claim 1 recites, wherein identifying the first merchant and the second merchant as complementary merchants is further based at least in part on output of a data model that has received as input inventory data associated with the plurality of merchants.

3. The system as claim 1 recites, wherein identifying the first merchant and the second merchant as complementary merchants based at least in part on the first transaction data comprises determining that the first merchant and the second merchant are at least one of (1) merchants from whom one or more customers purchase within a time that satisfies a time criterion, (2) merchants associated with one or more customers sharing demographic attributes, (3) merchants associated with a same type of item, (4) merchants associated with transactions involving a same customer identifier, or (5) merchants associated with locations that are within a distance of each other that meets a distance criterion.

4. The system as claim 1 recites, wherein identifying the first merchant and the second merchant as complementary merchants is further based at least in part on determining that one or more first inventory items of the first merchant and one or more second inventory items of the second merchant are at least one of (1) a similar item type, (2) purchased within a threshold amount of time of each other in a spending trend of at least one customer, or (3) purchased in a same transaction.

5. The system as claim 1 recites, wherein identifying the first merchant and the second merchant as complementary merchants is further based at least in part on (i) an indication that the first merchant and the second merchant are willing to participate in cross-merchant promotions, or (ii) a business relationship between the first merchant and the second merchant.

6. The system as claim 1 recites, the operations further comprising:
   responsive at least in part to receiving, by the payment service, the indication that the first merchant and the second merchant intend to participate in the at least one cross-merchant promotion, facilitating, the payment service, transmission of a notification of the at least one cross-merchant promotion to one or more customers of at least one of the first merchant or the second merchant, wherein the notification comprises at least one of a direct message, an online advertisement, or a digital receipt.

7. The system as claim 1 recites, wherein the recommendation includes suggested items for promotion in the at least one cross-merchant promotion.

8. The system as claim 1 recites, the operations further comprising:
   causing presentation, by the payment service and on at least one of a first merchant device of the first merchant or a second merchant device of the second merchant, of a notification of application of the at least one cross-merchant promotion in the second transaction.

9. The system as claim 1 recites, the operations further comprising:
   receiving, by the payment service, and from a plurality of merchant computing devices associated with the plurality of merchants, the first transaction data, the plurality of merchant computing devices each executing an instance of a merchant application installed for configuring the plurality of merchant computing devices as point-of-sale (POS) terminals, the instances of the merchant application configuring the POS terminals to communicate the first transaction data over a network.

10. The system as claim 1 recites, wherein identifying the first merchant and the second merchant as complementary merchants is further based at least in part on input to a user interface provided by the payment service indicating a desired merchant type with which to be paired.

11. A method comprising:
based at least in part on first transaction data associated with transactions of a plurality of merchants, identifying, by a payment service, a first merchant and a second merchant of the plurality of merchants as complementary merchants;
generating, by the payment service, a recommendation for the first merchant and the second merchant to participate in at least one cross-merchant promotion;
receiving, by the payment service, an indication that the first merchant and the second merchant intend to participate in the at least one cross-merchant promotion;
receiving, by the payment service, second transaction data associated with a second transaction associated with the first merchant, wherein the second transaction data includes a payment card number of a payment card offered for payment in the second transaction;
based at least in part on the payment card number, determining to apply the at least one cross-merchant promotion to the second transaction based on a transaction history of a customer associated with the payment card number;
processing a payment associated with the second transaction, wherein the payment is based at least in part on the at least one cross-merchant promotion; and
apportioning, by the payment service, the payment between the first merchant and the second merchant according to an agreement between the first merchant and the second merchant.

12. The method as claim 11 recites, wherein identifying the first merchant and the second merchant as complementary merchants is further based at least in part on output of a data model that has received as input inventory data associated with the plurality of merchants.

13. The method as claim 11 recites, wherein identifying the first merchant and the second merchant as complementary merchants based at least in part on the first transaction data comprises determining that the first merchant and the second merchant are at least one of (1) merchants from whom one or more customers purchase within a time that satisfies a time criterion, (2) merchants associated with one or more customers sharing demographic attributes, (3) merchants associated with a same type of item, (4) merchants associated with transactions involving a same customer identifier, or (5) merchants associated with locations that are within a distance of each other that meets a distance criterion.

14. The method as claim 11 recites, wherein determining that the first merchant and the second merchant are complementary merchants is further based at least in part on determining that one or more first inventory items of the first merchant and one or more second inventory items of the second merchant are at least one of (1) a similar item type, (2) purchased within a threshold amount of time of each other in a spending trend of at least one customer, or (3) purchased in a same transaction.

15. The method as claim 11 recites, wherein the recommendation includes suggested items for promotion in the at least one cross-merchant promotion.

16. The method as claim 11 recites, further comprising:
causing presentation, by the payment service and on at least one of a first merchant device of the first merchant or a second merchant device of the second merchant, of a notification of application of the at least one cross-merchant promotion in the second transaction.

17. The method as claim 11 recites, wherein identifying the first merchant and the second merchant as complementary merchants is further based at least in part on input to a user interface provided by the payment service indicating a desired merchant type with which to be paired.

18. One or more non-transitory computer-readable media storing instructions executable by one or more processors that, when executed by the one or more processors, cause the one or more processors to perform operations comprising:
based at least in part on first transaction data associated with transactions of a plurality of merchants, identifying, by a payment service, a first merchant and a second merchant of the plurality of merchants as complementary merchants;
generating, by the payment service, a recommendation for the first merchant and the second merchant to participate in at least one cross-merchant promotion;
receiving, by the payment service, an indication that the first merchant and the second merchant intend to participate in the at least one cross-merchant promotion;
receiving, by the payment service, second transaction data associated with a second transaction associated with the first merchant, wherein the second transaction data includes a payment card number of a payment card offered for payment in the second transaction;
based at least in part on the payment card number, determining to apply the at least one cross-merchant promotion to the second transaction based on a transaction history of a customer associated with the payment card number;
processing a payment associated with the second transaction, wherein the payment is based at least in part on the at least one cross-merchant promotion; and
apportioning, by the payment service, the payment between the first merchant and the second merchant according to an agreement between the first merchant and the second merchant.

19. The one or more non-transitory computer-readable media as claim 18 recites, the operations further comprising:
causing presentation, by the payment service and on at least one of a first merchant device of the first merchant or a second merchant device of the second merchant, of a notification of application of the at least one cross-merchant promotion in the second transaction.

20. The one or more non-transitory computer-readable media as claim 18 recites, the operations further comprising:
receiving, by the payment service, and from a plurality of merchant computing devices associated with the plurality of merchants, the first transaction data, the plurality of merchant computing devices each executing an instance of a merchant application installed for configuring the plurality of merchant computing devices as point-of-sale (POS) terminals, the instances of the merchant application configuring the POS terminals to communicate the first transaction data over a network.

* * * * *